United States Patent
Wu et al.

(10) Patent No.: US 11,555,976 B2
(45) Date of Patent: Jan. 17, 2023

(54) OPTICAL ELEMENT DRIVING MECHANISM

(71) Applicant: TDK TAIWAN CORP., Taoyuan (TW)

(72) Inventors: Fu-Yuan Wu, Taoyuan (TW); Guan-Bo Wang, Taoyuan (TW); Yi-Liang Chan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 189 days.

(21) Appl. No.: 16/896,444

(22) Filed: Jun. 9, 2020

(65) Prior Publication Data

US 2021/0124143 A1 Apr. 29, 2021

Related U.S. Application Data

(60) Provisional application No. 62/925,958, filed on Oct. 25, 2019.

(30) Foreign Application Priority Data

Feb. 3, 2020 (CN) .......................... 202020150606.4

(51) Int. Cl.
G02B 7/02 (2021.01)
G02B 27/64 (2006.01)
G02B 7/09 (2021.01)

(52) U.S. Cl.
CPC ............. *G02B 7/02* (2013.01); *G02B 27/646* (2013.01); *G02B 7/09* (2013.01)

(58) Field of Classification Search
None
See application file for complete search history.

(56) References Cited

U.S. PATENT DOCUMENTS

| | | | |
|---|---|---|---|
| 2016/0161828 A1* | 6/2016 | Lee .......................... | G02B 7/04 359/824 |
| 2017/0017093 A1* | 1/2017 | Minamisawa ....... | G02B 27/646 |
| 2020/0200995 A1* | 6/2020 | Lee ......................... | G03B 30/00 |

* cited by examiner

*Primary Examiner* — Darryl J Collins
*Assistant Examiner* — Tamara Y. Washington
(74) *Attorney, Agent, or Firm* — Muncy, Geissler, Olds & Lowe, P.C.

(57) ABSTRACT

An optical element driving mechanism is provided. The optical element driving mechanism includes a movable portion, a fixed portion, and a driving assembly. The movable portion connects to an optical element having a main axis. The movable portion is movable relative to the fixed portion. The driving assembly is used to drive the movable portion so that it moves relative to the fixed portion, wherein the movable portion comprises a first connecting portion that is movably connected to the fixed portion.

17 Claims, 14 Drawing Sheets

OPTICAL ELEMENT DRIVING MECHANISM

CROSS REFERENCE TO RELATED APPLICATIONS

This application claims the benefit of U.S. Provisional Application No. 62/925,958, filed on Oct. 25, 2019 and China Patent Application No. 202020150606.4, filed on Feb. 3, 2020, which are incorporated by reference herein in their entirety.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices has been toward smaller sizes and better durability. As a result, how to effectively reduce the size of the driving mechanism and how to increase its durability has become an important issue.

BRIEF SUMMARY OF DISCLOSURE

An optical element driving mechanism is provided. The optical element driving mechanism includes a movable portion, a fixed portion, and a driving assembly. The movable portion connects to an optical element with a main axis. The movable portion is movable relative to the fixed portion. The driving assembly is used to move the movable portion relative to the fixed portion, wherein the movable portion comprises a first connecting portion that is movably connected to the fixed portion.

In some embodiments, the movable portion includes a first movable portion and a second movable portion, and the driving assembly is at least partially disposed on the first movable portion, the second movable portion, and the fixed portion. In some embodiments, the driving assembly includes two first magnetic elements and two second magnetic elements, one of the first magnetic elements is disposed on the first movable portion, another first magnetic element is disposed on the second movable portion, and the second magnetic elements are disposed on the fixed portion. In some embodiments, the driving assembly includes two first magnetic elements and two second magnetic elements, one of the second magnetic elements is disposed on the first movable portion, another one of the second magnetic elements is disposed on the second movable portion, and the first magnetic elements are disposed on the fixed portion.

In some embodiments, the driving assembly includes two first magnetic elements and two second magnetic elements, one of the first magnetic elements is disposed on the first movable portion, one of the second magnetic elements is disposed on the second movable portion, and another first magnetic element and another second magnetic element are disposed on the fixed portion. In some embodiments, the optical element driving mechanism further includes two position sensors, wherein one of the position sensors is at least partially disposed on the first movable portion and the fixed portion, and another one of the position sensors is at least partially disposed on the second movable portion and the fixed portion. In some embodiments, the optical element driving mechanism further includes two position sensors at least partially disposed on the first movable portion.

In some embodiments, the optical element driving mechanism further includes a position adjusting element disposed between the first connecting portion and the fixed portion. In some embodiments, the height of height of the first movable portion is greater than the height of the second movable portion along the main axis. In some embodiments, the optical element driving mechanism further includes another first connecting portion, and the two first connecting portions are positioned on a diagonal of the first movable portion. In some embodiments, the optical element driving mechanism further includes two second connecting portions disposed on the diagonal of the second movable portion. The two second connecting portions are movably connected to the first movable portion.

In some embodiments, the center of the optical element driving mechanism has a distance that is greater than zero to the main axis when viewed along the main axis. In some embodiments, the material of the first connecting portion includes metal. In some embodiments, the fixed portion has a recess, and one of the second connecting portions is disposed in the recess. In some embodiments, the recess has an arc shape, and the second connecting portion has the shape of a column, and the radius of curvature of the recess is greater than the radius of curvature of the second connecting portion. In some embodiments, the fixed portion includes a case disposed on the recess, wherein the bottom surface of the case faces the recess, and the second connecting portion has a distance that is greater than zero to the bottom surface. In some embodiments, possible shapes for the recess include a V shape, a rectangle, a trapezoid, an oval, and an arc.

In some embodiments, the optical element driving mechanism further includes a resilient element disposed on the movable portion. In some embodiments, In some embodiments, the optical element driving mechanism is connected to the optical element through an optical module, and the optical module is in direct contact with the movable portion. In some embodiments, the optical module is connected to the movable portion at corners of the optical module, and the optical module is affixed to the movable portion.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact with each other.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1:
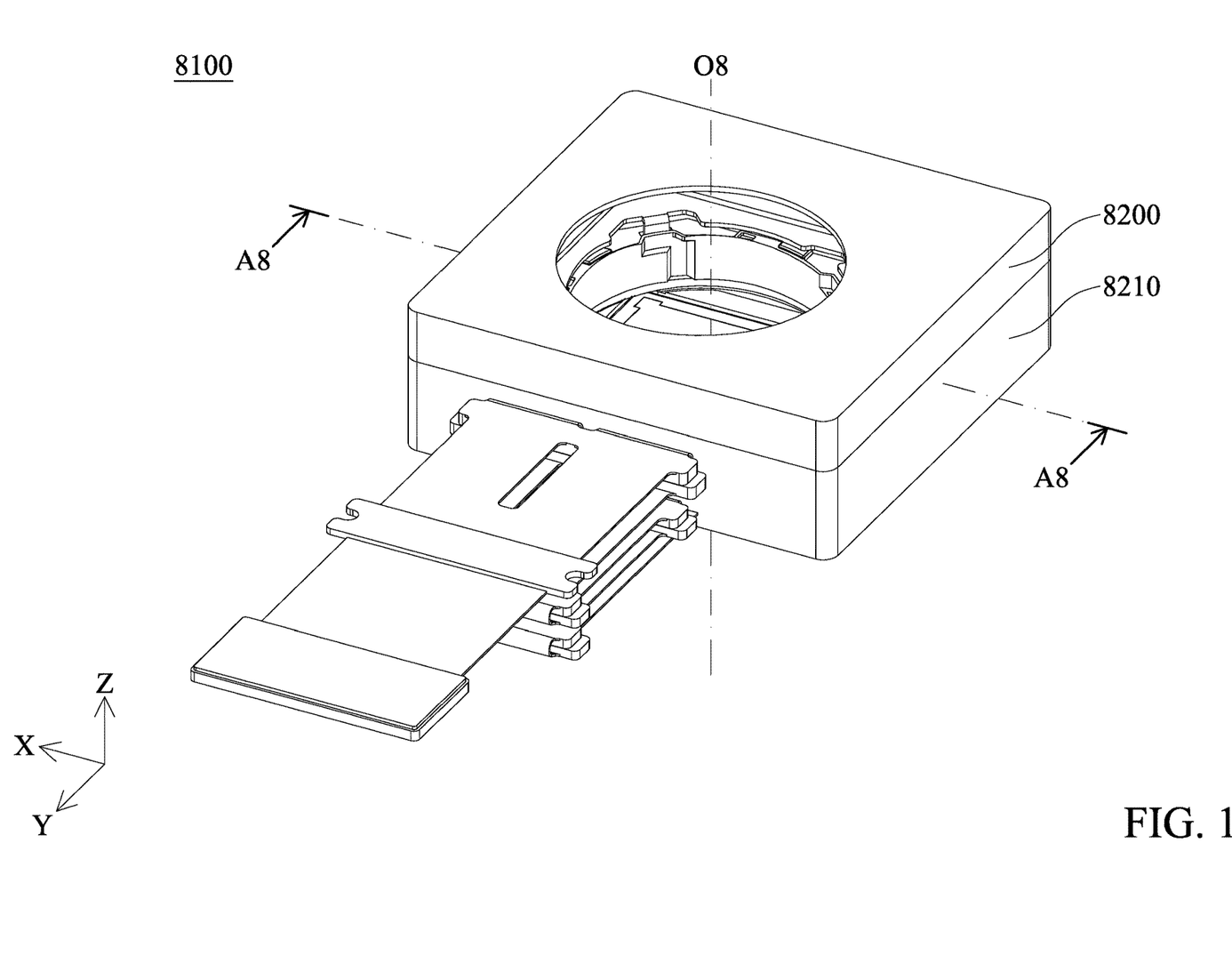
FIG. 1 is a perspective view of an optical element driving mechanism according to some embodiments of the present disclosure.
Figure 2:
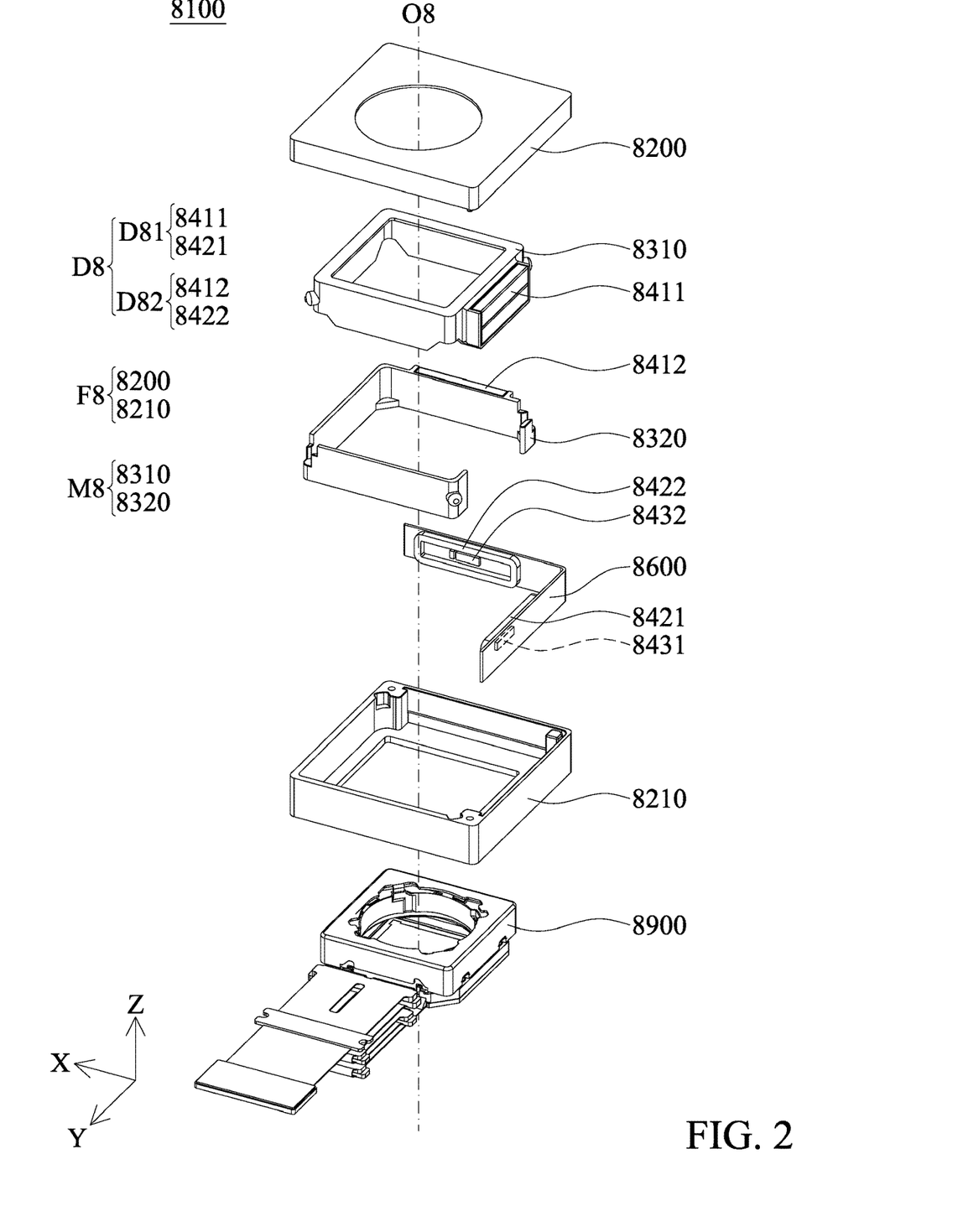
FIG. 2 is an exploded view of the optical element driving mechanism.
Figure 3:
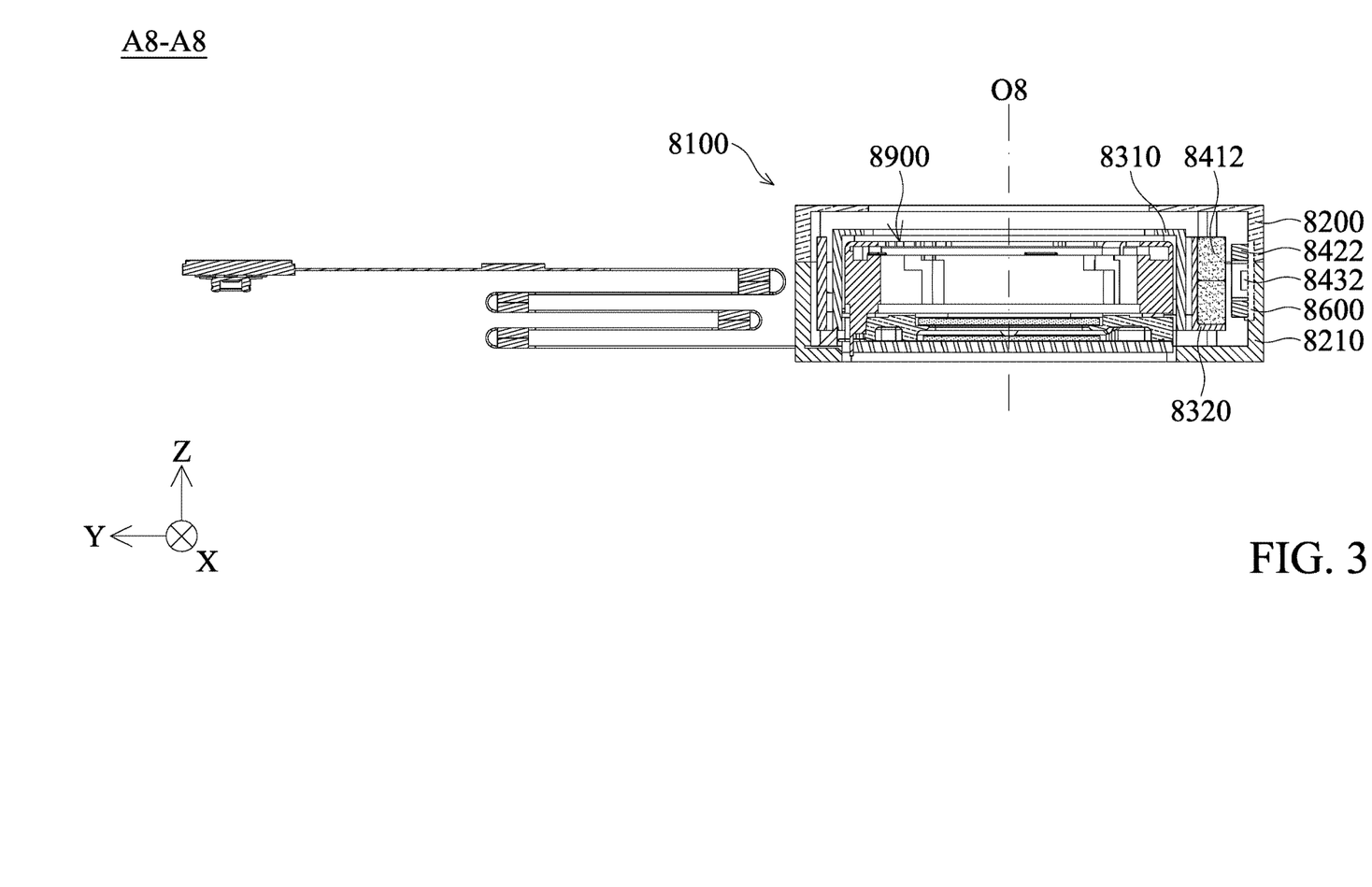
FIG. 3 is a cross-sectional view of the optical element driving mechanism.

In some embodiments of the present disclosure, FIG. 1 to FIG. 3 are a perspective view and an exploded view of an optical element driving mechanism 8100, and a cross-sectional view illustrated along a line A8-A8 in FIG. 1, respectively. In FIG. 1, the optical element driving mechanism 8100 mainly includes a case 8200, a base 8210, a first movable portion 8310, a second movable portion 8320, first magnetic elements 8411, 8412, second magnetic elements 8421, 8422, position sensors 8431, 8432, and a circuit board 8600. The optical element driving mechanism 8100 may be used for driving an optical module 8900, or may be used for driving various optical elements, such as a lens, a mirror, a prism, a beam splitter, or an aperture.

In some embodiments, the case 8200 and the base 8210 may be combined to form the outer case of the optical element driving mechanism 8100. Furthermore, the case 8200 and the base 8210 serve as a fixed portion F8.

In some embodiments, the first movable portion 8310 and the second movable portion 8320 may serve as a movable portion M8, and the first movable portion 8310 and the second movable portion 8320 may move relative to the fixed portion F8 (including the case 8200 and the base 8210). In some embodiments, the second movable portion 8320 may be moved relative to the first movable portion 8310, and the direction of motions of the first movable portion 8310 and the second movable portion 8320 are different (such as rotatable relative to different axes). As a result, the optical module 8900 may move with the movable portion M8 to achieve optical image stabilization (OIS).

In some embodiments, the first magnetic element 8411 and the second magnetic element 8421 may serve as a first driving assembly D81. The first magnetic element 8412 and the second magnetic element 8422 may serve as a second driving assembly D82. The first driving assembly D81 and the second driving assembly D82 may serve as a driving assembly D8 to move the movable portion M8 relative to the fixed portion F8. For example, the first magnetic elements 8411, 8412 and the second magnetic elements 8421, 8422 may include a combination of driving coil and driving magnet. For example, the first magnetic elements 8411, 8412 may be driving magnets, and the second magnetic elements 8421, 8422 may be driving coils. In another example, the first magnetic elements 8411, 8412 may be driving coils, and the second magnetic elements 8421, 8422 may be driving magnets, but it is not limited thereto. In some embodiments, the shape of the second magnetic elements 8421, 8422 may be oval.

The first magnetic elements 8411, 8412 and the second magnetic elements 8421, 8422 may be positioned on the fixed portion F8 and the movable portion M8, respectively.

In some embodiments, the first magnetic elements 8411, 8412 (or the second magnetic elements 8421, 8422) are respectively disposed on the first movable portion 8310 and the second movable portion 8320 for moving the first movable portion 8310 and the second movable portion 8320. In some embodiments, the first magnetic element 8411 may be disposed on the first movable portion 8310, the second magnetic element 8422 may be disposed on the second movable portion 8320, and the first magnetic element 8412 and the second magnetic element 8421 may be disposed on the fixed portion F8. In some embodiments, the first magnetic elements 8411, 8412 may be disposed on the first movable portion 8310.

It should be noted that the interaction between the first magnetic elements 8411, 8412 and the second magnetic elements 8421, 8422 may generate a magnetic force for moving the optical module 8900 relative to the fixed portion, so auto focus (AF) or optical image stabilization (OIS) may be achieved. In some embodiments, the driving assembly D8 may include other driving elements, such as piezoelectric elements, shape memory alloys, etc.

Furthermore, the circuit board 8600 may be, for example, a flexible printed circuit (FPC), which may be affixed to the fixed portion F8 by adhesion. In some embodiments, the circuit board 8600 is electrically connected to other electronic elements disposed inside or outside the optical element driving mechanism 8100. For example, the circuit board 8600 may send electric signal to the driving assembly D8 to control the movement of the movable portion 8300.

In some embodiments, position sensors 8431, 8432 may be disposed in the optical element driving mechanism 8100 and corresponding to the first driving assembly D81 and the second driving assembly D82, to detect the position of the movable portion M8 relative to the fixed portion F8. The position sensors 8431, 8432 may include Hall sensor, magnetoresistance effect sensor (MR Sensor), giant magnetoresistance effect sensor (GMR sensor), tunneling magnetoresistance effect sensor (TMR sensor), or fluxgate sensor.

In some embodiments, the position sensor 8431 may be at least partially disposed on the first movable portion 8310 and the fixed portion F8, and the position sensor 8432 may be at least partially disposed on the second movable portion 8320 and the fixed portion F8 to detect the movement of the first movable portion 8310 and the second movable portion in different directions. Furthermore, in some embodiments, the position sensors 8431, 8432 may be at least partially disposed on the first movable portion 8310 or the second movable portion 8320 to enhance detection.

Figure 4:
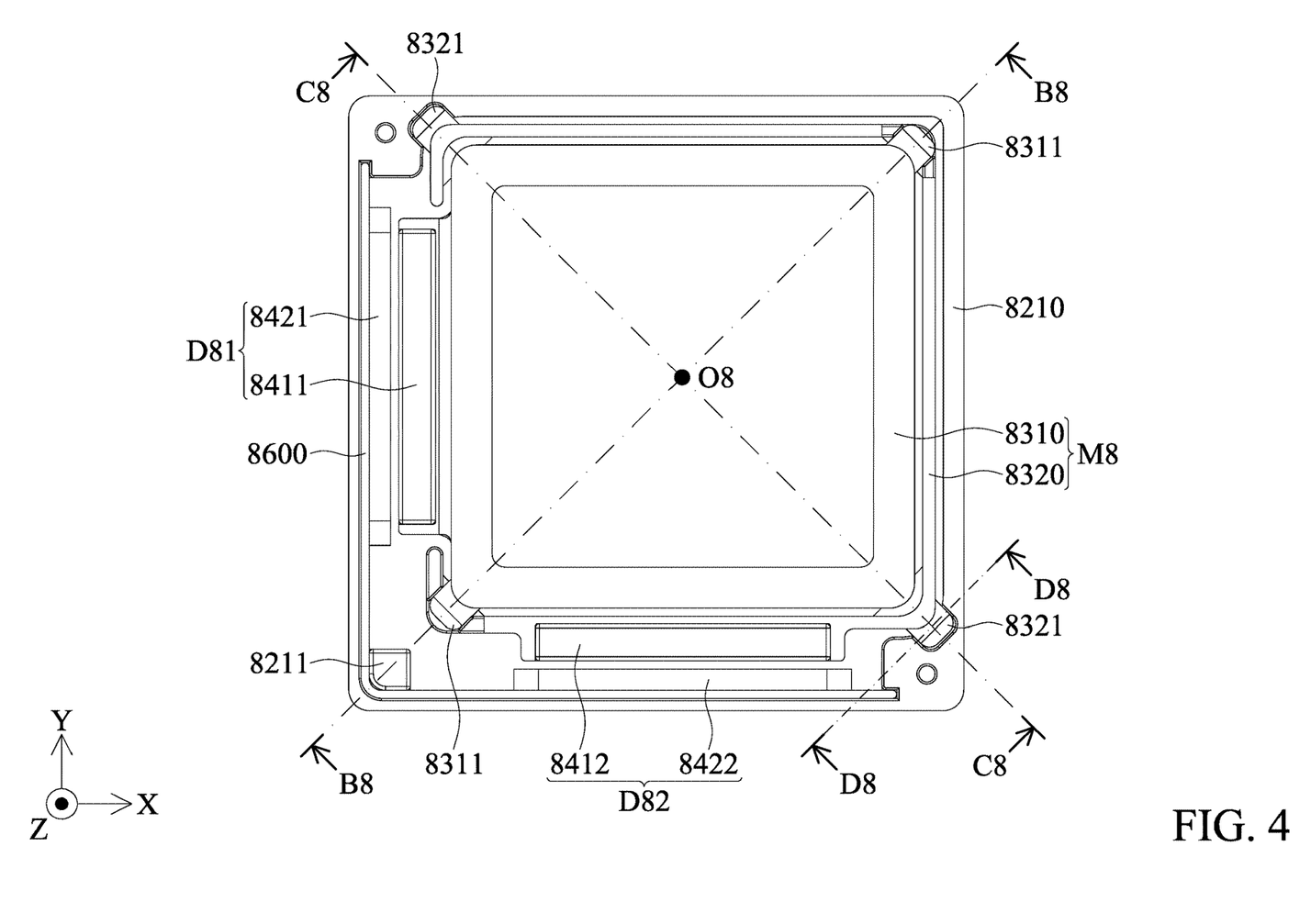
FIG. 4 is a top view of some elements of the optical element driving mechanism.
Figure 5:
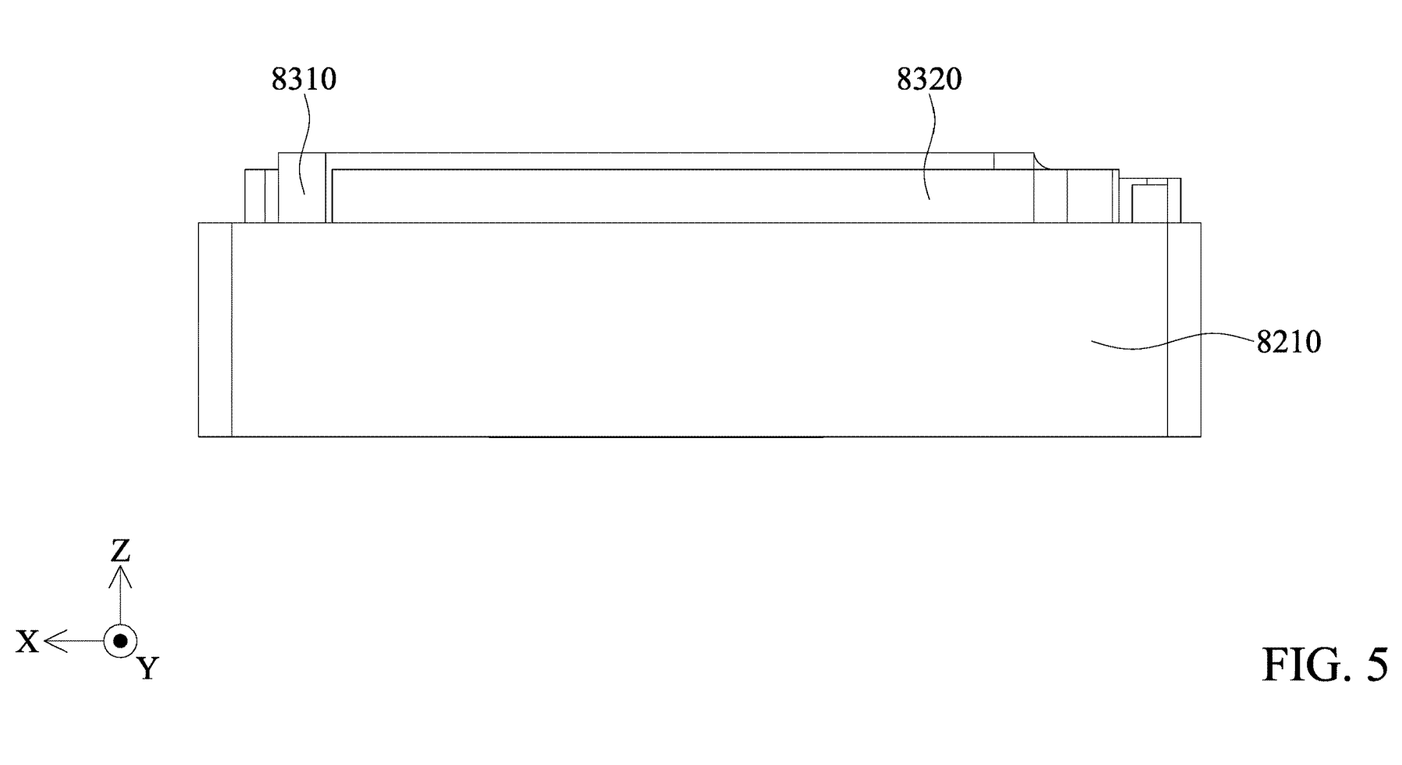
FIG. 5 is a side view of the optical element driving mechanism.

FIG. 4 is a schematic view of some elements of the optical element driving mechanism 8100, and FIG. 5 is a side view of the elements in FIG. 4. As shown in FIG. 4, first connecting portions 8311 may be positioned on a diagonal of the first movable portion 8310, and line B8-B8, which connects the two first connecting portions 8311, may act as the rotational axis of the first movable portion 8310 relative to the base 8210. Furthermore, second connecting portions 8321 may be positioned on a diagonal of the second movable portion 8320, and line C8-C8, which connects the two second connecting portions 8321, may act as the rotational axis of the second movable portion 8320 relative to the first movable portion 8310. The main axis O8 of the optical element driving mechanism 8100 may be an axis that passes through the intersection of line B8-B8 and line C8-C8 and extends in Z direction.

As shown in FIG. 4, the first driving assembly D81 and the second driving assembly D82 are positioned on different sides of the movable portion M8, and the driving assembly D8 may be not positioned on the identical sides of the movable portion M8. In other words, the main axis O8 of the optical element driving mechanism 8100 may have a distance (which is greater than zero) from the center of the optical element driving mechanism 8100, rather than passing through the center of the optical element driving mechanism 8100 when viewed in Z direction. For example, if the optical element driving mechanism 8100 has a rectangular shape when viewed in the Z direction, the center of the optical element driving mechanism 8100 may be defined as a point that passes through two diagonals. As a result, the number of elements of the driving assembly D8 may be reduced to achieve miniaturization. Furthermore, as shown in FIG. 5, the height of the first movable portion 8310 is greater than the height of the second movable portion 8320 in the Z direction, which means the distance between the top surface of the first movable portion 8310 and the bottom surface of the second movable portion 8320 is greater than the distance between the top surface of the second movable portion 8320 and the bottom surface of the base 8210.

Figure 6:
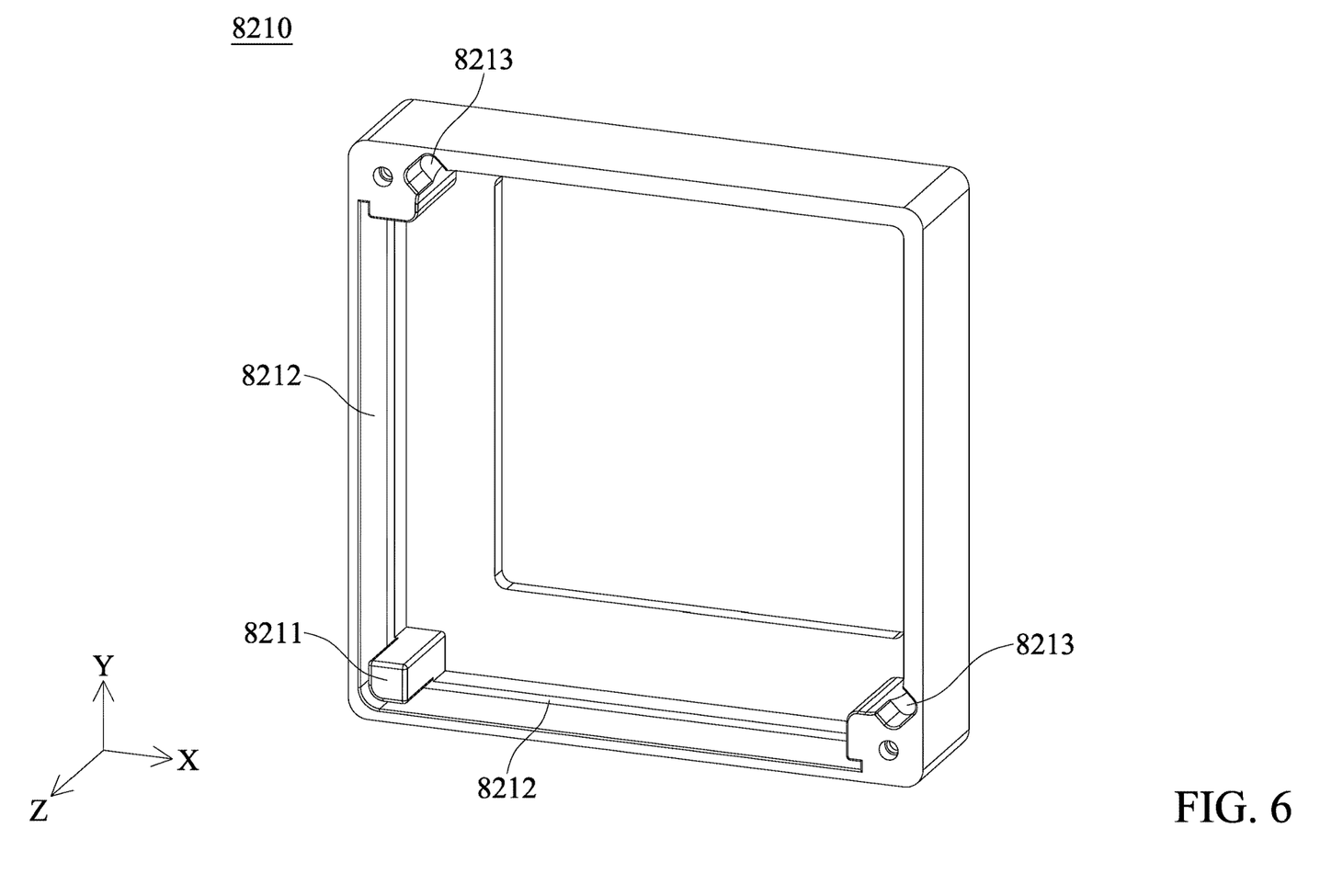
FIG. 6 is a schematic view of the base.

FIG. 6 is a schematic of the base 8210. Referring to FIG. 4 and FIG. 6, a pair of recesses 8213 may be formed at the diagonal of the base 8210, and the recesses 8213 corresponds to the second connecting portions 8321 positioned at the diagonal of the second movable portion 8320. Furthermore, the base 8210 may have a column 8211 disposed at a corner of the base 8210 where no recess 8213 is formed, and the column may extend in Z axis. Accommodating portions 8212 may be formed at the sides of the base 8210, the circuit board 8600 may be accommodated in the accommodating portions 8212, and the position of the circuit board 8600 may be defined by the column 8211. For example, the accommodating portions 8212 may position at two adjacent sides of the base 8210, and the circuit board 8600 may be L-shaped so that it may accommodated in the two accommodating portions 8212.

Figure 7:
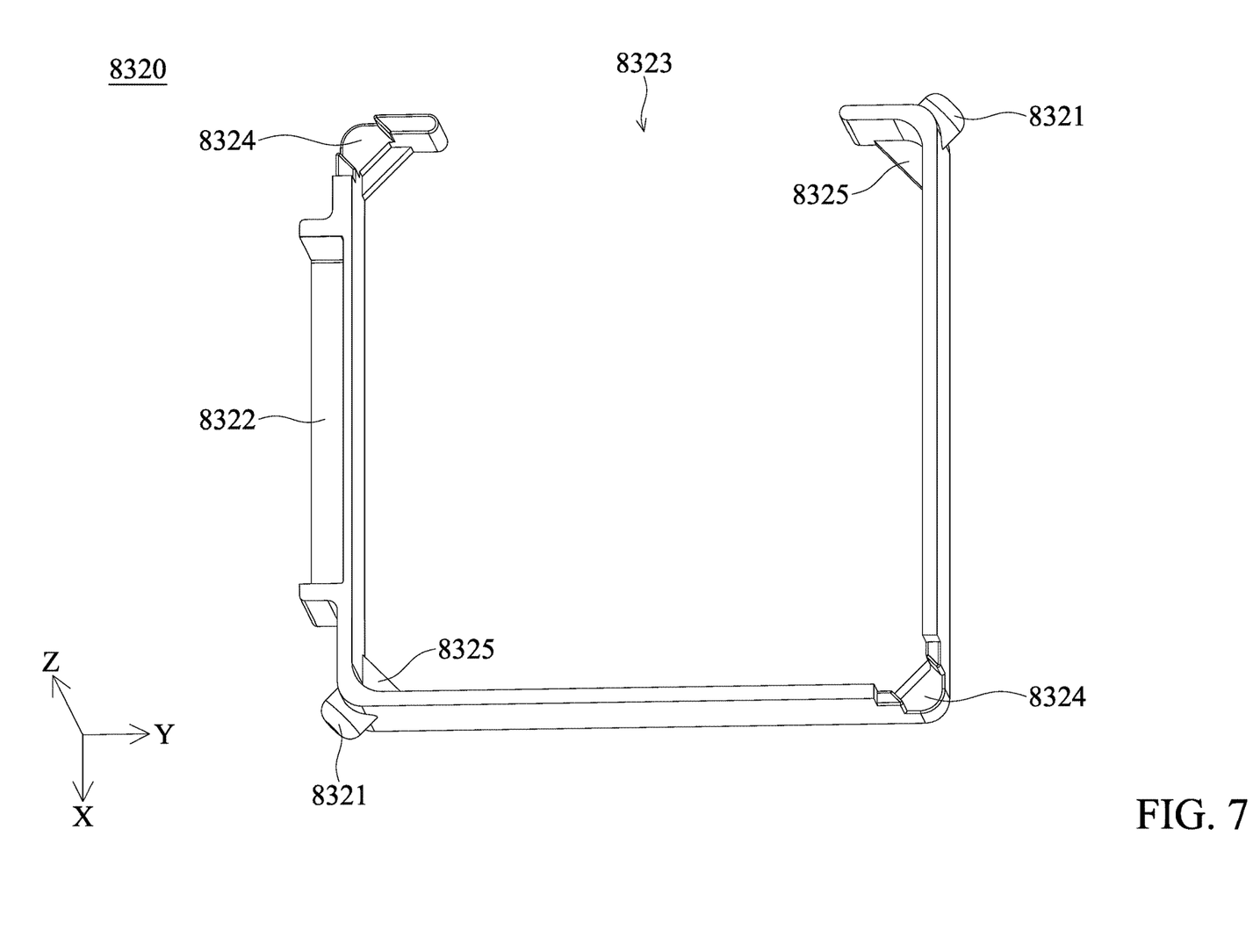
FIG. 7 is a schematic view of the second movable portion.

FIG. 7 is a schematic view of the second movable portion 8320. Refer to FIG. 4 and FIG. 7, second connecting portions 8321 may be formed at the diagonal of the second movable portion 8320 and may protrude outwardly from the movable portion 8320. An accommodating space 8322 may be formed at a side of the second movable portion 8320, and the first magnetic element 8412 may be disposed in the accommodating space 8322, for example it may be affixed in the accommodating space 8322 using glue. Furthermore, an opening 8323 may be formed at a side of the second movable portion 8320, so the first driving assembly D81 may be disposed at the opening 8323 and on the first movable portion 8310. Another diagonal on which no second connecting portion 8321 is disposed has concave portions 8324, and the first connecting portions 8311 of the first movable portion 8310 may be disposed in the concave portions 8324. Stopping portions 8325 may be formed on the diagonal of the second movable portion 8320 that is corresponding to the second connecting portions 8321, and the movable range of the first movable portion 8310 relative to the second movable portion 8320 may be restricted by the stopping portions 8325.

Figure 8:
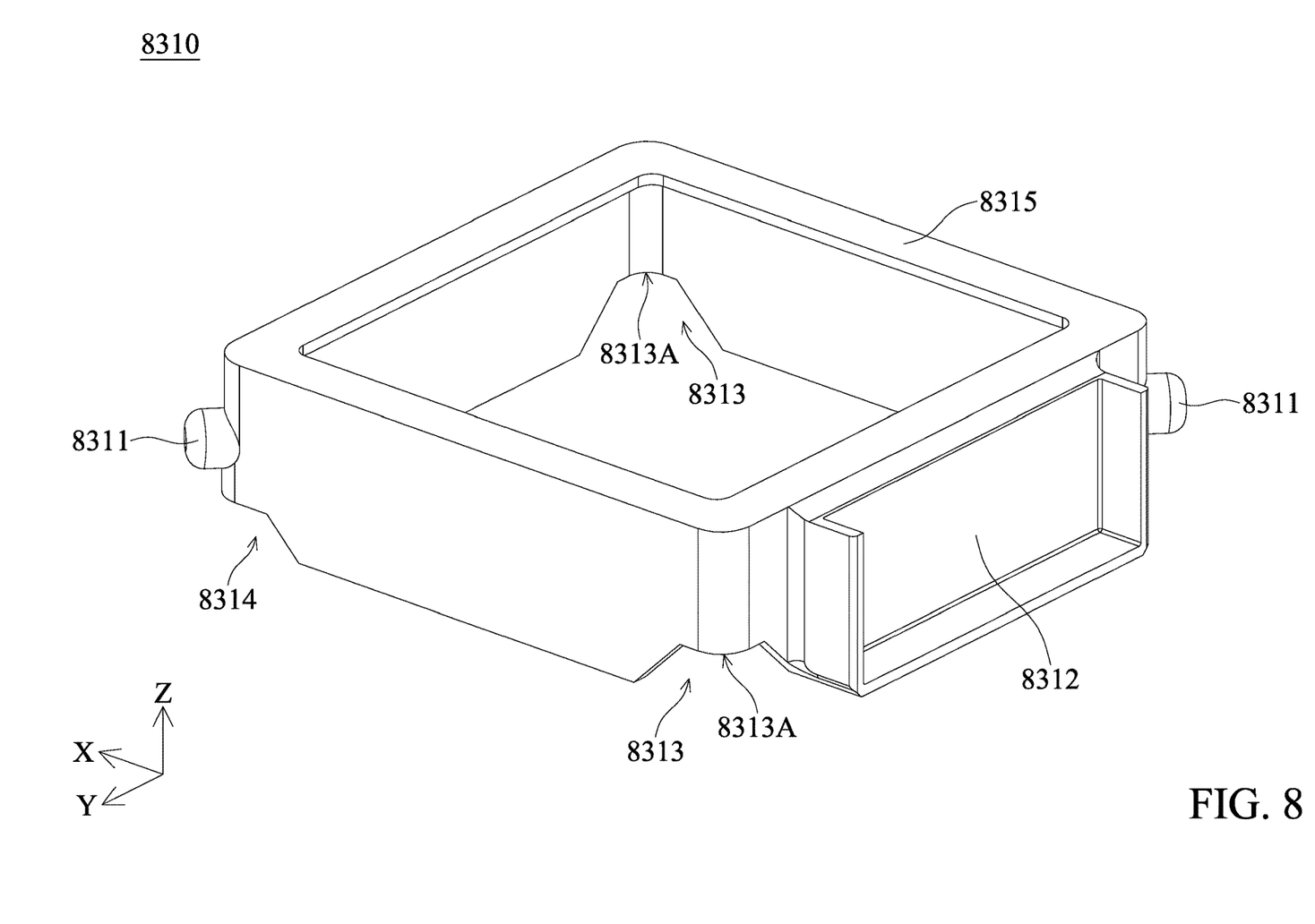
FIG. 8 is a schematic view of the first movable portion.

FIG. 8 is a schematic view of the first movable portion 8310. Refer to FIG. 4 and FIG. 8, first connecting portions 8311 that protruding outwardly from the first movable portion 8310 may be formed at the diagonal of the first movable portion 8310. An accommodating space 8312 may be formed at a side of the first movable portion 8310, and the first magnetic element 8411 may be disposed in the accommodating space 8312. For example, the first magnetic element 8411 may be affixed in the accommodating space 8312 by glue. Furthermore, concave portions 8313 and concave portions 8314 may be formed at the corners of the movable portion 8310, wherein the bottom surface 8313A of the concave portion 8313 faces the stopping portion 8325 of the second movable portion 8320. The movable range of the first movable portion 8310 relative to the second movable portion 8320 may be limited by the bottom surface 8313A and the stopping portion 8325. In some embodiments, the two bottom surfaces 8313A may position on an identical plane in Z direction, and the two stopping portions 8325 may position on an identical plane in Z direction, so the movable range of the movable portion M8 in different directions may be balanced. Furthermore, a stopping portion 8315 may be formed on the first movable portion 8310, the optical module 8900 may be attached on the stopping portion 8315, such as be affixed to the stopping portion 8315, to allow the optical module 8900 and the first movable portion 8310 moving together.

Figure 9:
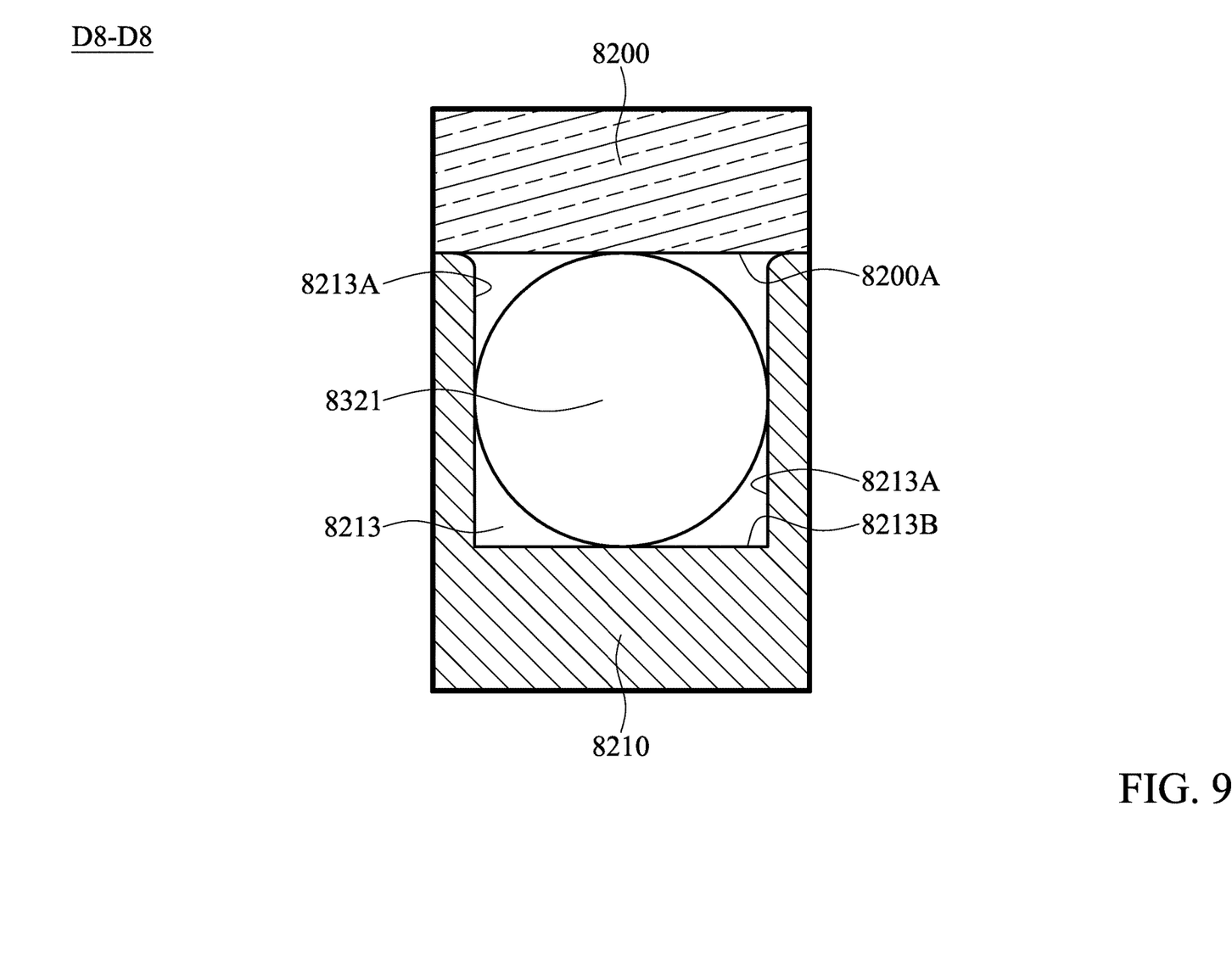
FIG. 9 is a partial cross-sectional view of the optical element driving mechanism.

FIG. 9 is a partial cross-sectional view illustrated along line D8-D8 in FIG. 4, and the case 8200 is also shown in FIG. 9. In some embodiments, the second connecting portion 8321 may be shaped like a column and be positioned in the recess 8213 of the base 8210, and the second connecting portion 8321 may in direct contact with side surfaces 8213A, 8213B and the bottom surface 8200A of the case 8200. As a result, the contact area between the second connecting portion 8321 and other elements may be increased, so friction between the second connecting portion 8321 and a single surface may be reduced. As a result, the second connecting portion 8321 may rotate in the recess 8213. In some embodiments, a material used for lubrication (such as a lubricant) may be provided on the second connecting portion 8321 of the second movable portion 8320 to reduce the friction of the connecting portions even further when it rotates.

Although the second connecting portion 8321 may in direct contact with the side surfaces 8213A, 8213B and the bottom surface 8200A, the present disclosure is not limited thereto. In some embodiments, the second connecting portion 8321 may fit tightly with the side surfaces 8213A and is a distance away from the bottom surface 8200A. In some embodiments of the present disclosure, the first connecting portion 8311 or the second connecting portion 8321 may include metal to enhance the durability of the first connecting portion 8311 or the second connecting portion 8321. For example, metal may be provided in the first connecting portion 8311 or the second connecting portion 8321 by insert molding.

Although the recess 8213 has a rectangular shape in FIG. 9, the present disclosure is not limited thereto. For example, the shape of the cross-section of the recess 8213 or the concave portion 8324 (e.g., illustrated along line D8-D8) may have a V shape, a rectangle, a trapezoid, an oval, or an arc, depending on design requirements. In other words, the portion of the recess 8213 or the concave portion 8324 that is in direct contact with the first connecting portion 8311 or the second connecting portion 8321 may include a rounded angle so that the friction between the movable portion M8 and other elements may be reduced when the movable portion M8 is moving. In some embodiments, an additional position adjusting element (not shown) may be provided in the recess 8213 or the concave portion 8324, or it may be provided between the case 8200 and the base 8210 to adjust the position of the first movable portion 8310 or the second movable portion 8320, so the usage of the optical element driving mechanism 8100 may be more flexible. Furthermore, as shown in FIG. 4, the first movable portion 8310 may move along line B8-B8, and the second movable portion 8320 may move along line C8-C8.

In some embodiments, additional resilient elements (such as a spring or gel, not shown) may be provided on the movable portion M8 to allow the movable portion M8 returning to an initial position when no current is provided to the optical element driving mechanism 8100. As a result, the movable portion M8 may be prevented from colliding with the fixed portion F8 when the optical element driving mechanism 8100 is not operating.

Figure 10:
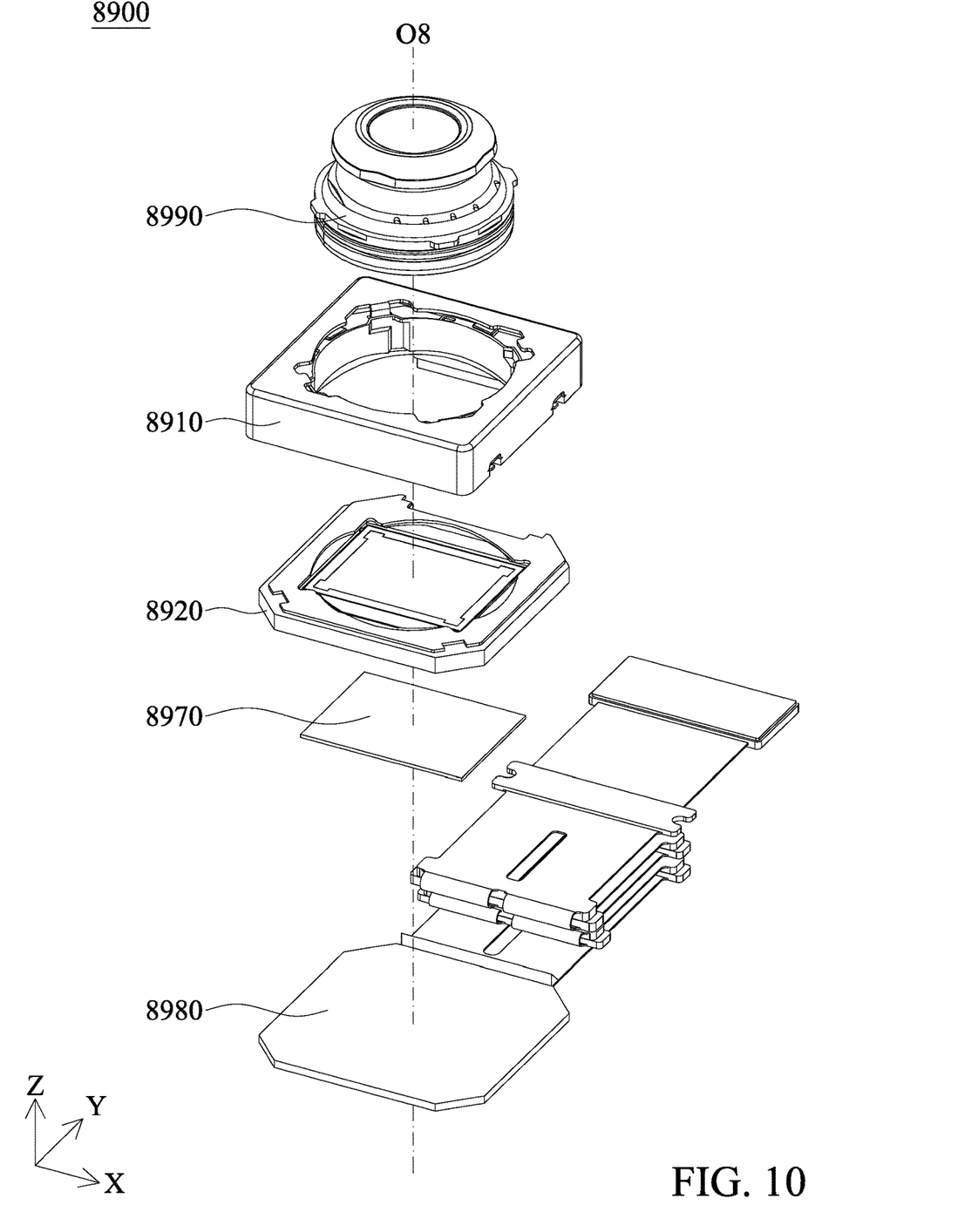
FIG. 10 is an exploded view of the optical module.

FIG. 10 is an exploded view of the optical module 8900. The optical module 8900 may include a frame 8910, a base 8920, and an optical element 8990 disposed between the frame 8910 and the base 8920. It should be noted that the case opening and the bottom opening are formed on the frame 8910 and the base 8920, respectively. The center of the case opening corresponds to the main axis O8 of the optical element 8990, and the base opening corresponds to a photo sensor 8970, and the photo sensor 8970 may be disposed on a substrate 8980. As a result, the optical element 8990 disposed in the optical module 8900 may focus with the photo sensor 8970 along the main axis O8 (i.e. Z direction).

Furthermore, a moving assembly (not shown) which is movable relative to the frame 8910 and the base 8920 may be disposed in the optical module 8900, and the optical element 8990 may be fixed on the movable assembly, such as by locking, gluing, or engaging. Furthermore, additional driving component may be provided in the optical module 8900, such as an assembly of a magnet and a coil (not shown), to move the optical element 8990 with the movable assembly in a direction that is different than the direction of motion of the movable portion M8. As a result, the optical element 8990 may be moved in more directions. For example, the optical element 8990 may be moved on X, Y, or Z direction.

The substrate 8980 may be, for example, a flexible printed circuit (FPC) board, which may be affixed to the base 8920 by adhesion. In some embodiments, the substrate 8980 is electrically connected to other electronic elements disposed inside or outside the optical module 8900. For example, the substrate 8980 may send electric signal to the driving component to control the movement of the movable assembly in the X, Y or Z direction.

Figure 11:
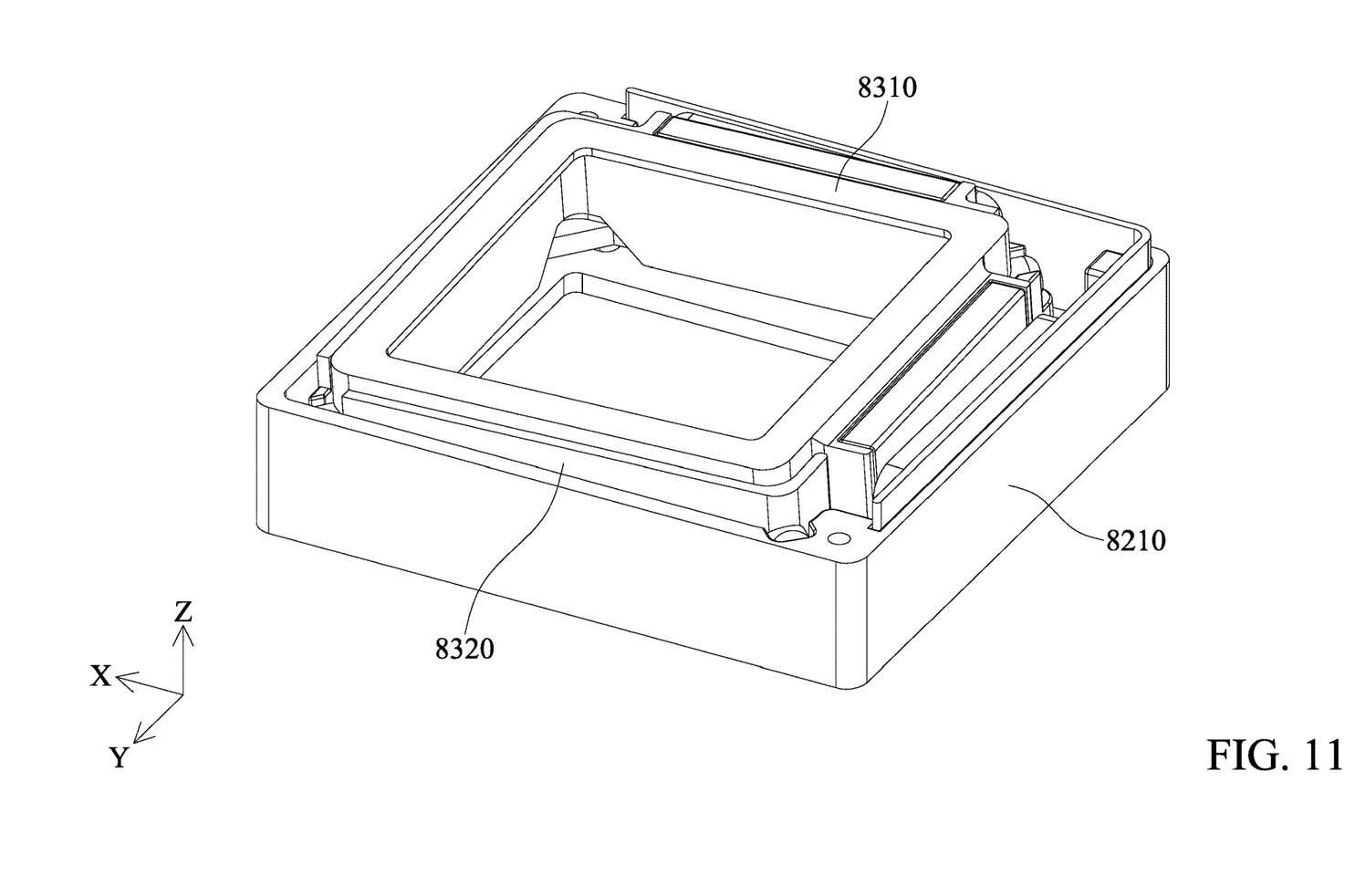
FIG. 11 is a schematic view of some elements of the optical element driving mechanism in one condition.
Figure 12:
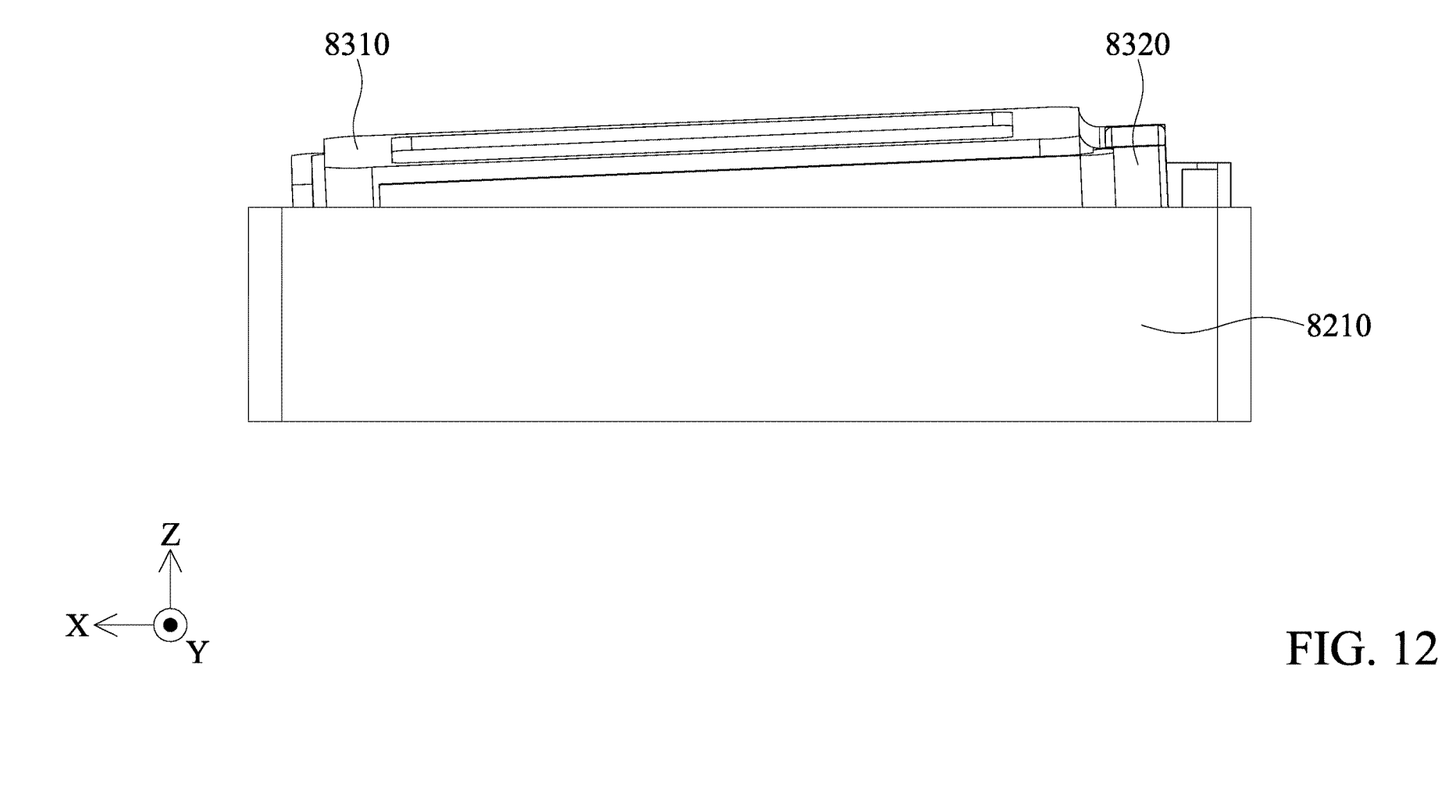
FIG. 12 is a side view of some elements of the optical element driving mechanism in one condition.
Figure 13:
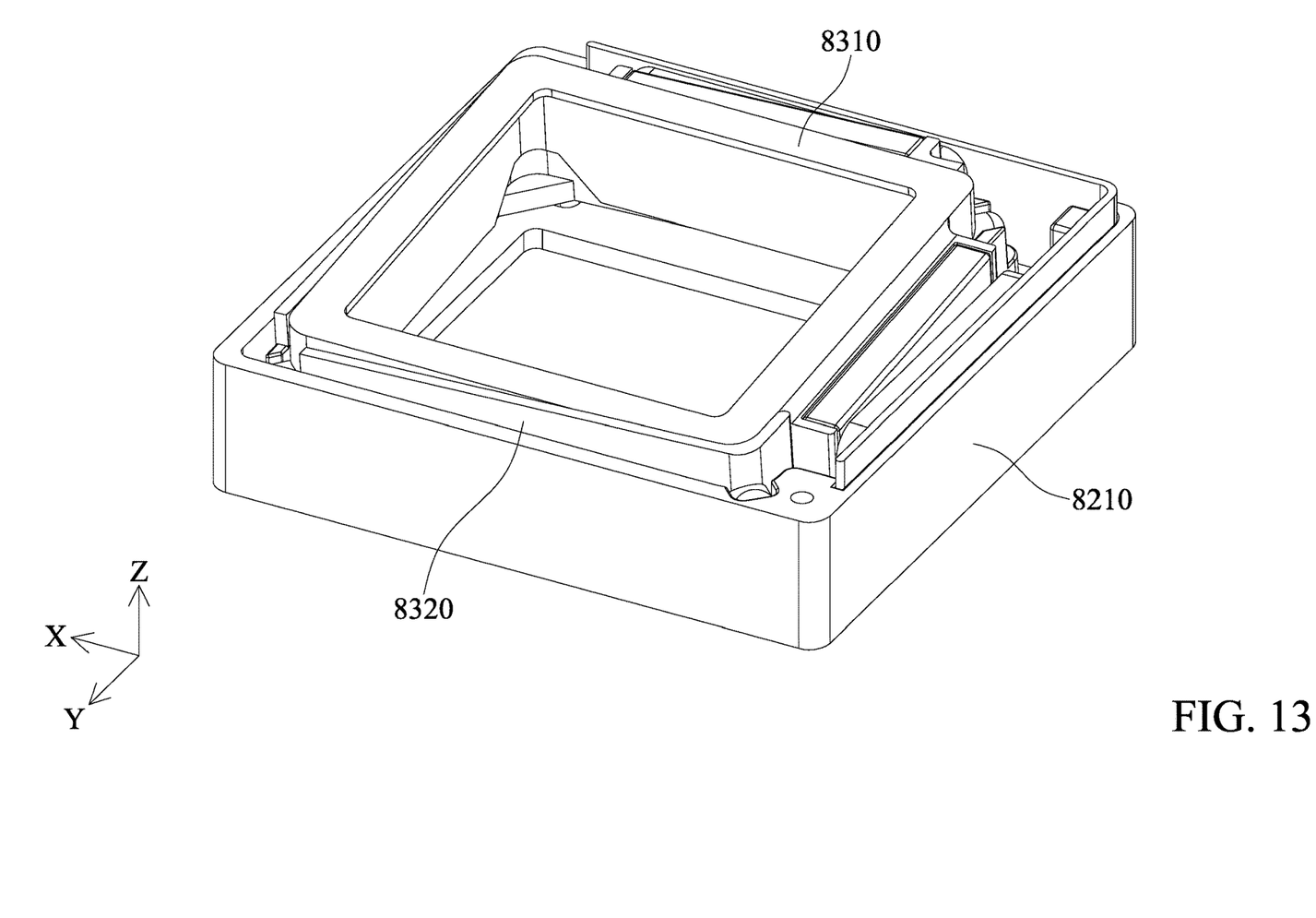
FIG. 13 is a schematic view of some elements of the optical element driving mechanism in another condition.
Figure 14:
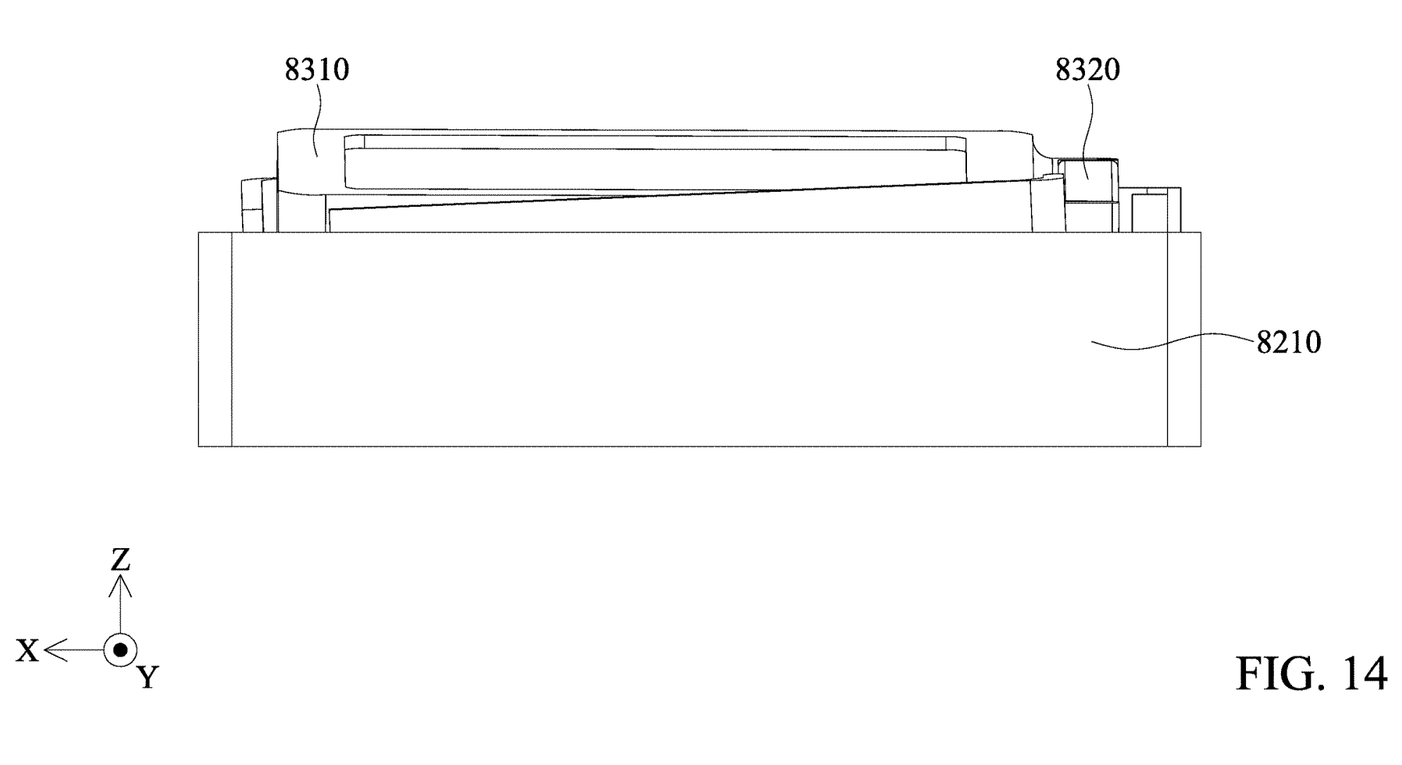
FIG. 14 is a side view of some elements of the optical element driving mechanism in another condition.

FIG. 11 and FIG. 12 are a schematic view and a side view of some elements of the optical element driving mechanism 8100, wherein the second movable portion 8320 is rotating relative to the base 8210, and the first movable portion 8310 does not move relative to the second movable portion 8320. FIG. 13 and FIG. 14 are a schematic view and a side view of some elements of the optical element driving mechanism 8100, wherein the first movable portion 8310 is further rotating relative to the second movable portion 8320 after the condition in FIG. 11. As shown in FIG. 11 to FIG. 14, the movable portion M8 may be rotated in different directions by the driving force generated by the driving assembly D8 to achieve optical image stabilization.

In summary, an optical element driving mechanism is provided. The optical element driving mechanism includes a movable portion, a fixed portion, and a driving assembly. The movable portion connects to an optical element with a main axis. The movable portion is movable relative to the fixed portion. The driving assembly is used to move the movable portion relative to the fixed portion, wherein the movable portion comprises a first connecting portion that is movably connected to the fixed portion. The design of the present disclosure provides the optical element with additional directions of motion, so the performance of the optical module is improved, and miniaturization can be achieved.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
    a movable portion for connecting to an optical element having a main axis, wherein the movable portion comprises a first movable portion and a second movable portion;
    a fixed portion, wherein the movable portion is movable relative to the fixed portion; and
    a driving assembly to drive the movable portion to move relative to the fixed portion and at least partially disposed on the first movable portion, the second movable portion, and the fixed portion, wherein the movable portion comprises at least two first connecting portions movably connected to and in direct contact with the fixed portion positioned on a diagonal of the first movable portion, and the second movable portion comprises at least two second connecting portions disposed on a diagonal of the second movable portion and movably connected to the first movable portion.

2. The optical element driving mechanism as claimed in claim 1, wherein the driving assembly comprises two first magnetic elements and two second magnetic elements, one of the first magnetic elements is disposed on the first movable portion, another first magnetic element is disposed on the second movable portion, and the second magnetic elements are disposed on the fixed portion.

3. The optical element driving mechanism as claimed in claim 1, wherein the driving assembly comprises two first magnetic elements and two second magnetic elements, one of the second magnetic elements is disposed on the first movable portion, another second magnetic element is disposed on the second movable portion, and the first magnetic elements are disposed on the fixed portion.

4. The optical element driving mechanism as claimed in claim 1, wherein the driving assembly comprises two first magnetic elements and two second magnetic elements, one of the first magnetic elements is disposed on the first movable portion, one of the second magnetic elements is disposed on the second movable portion, and another first magnetic element and another second magnetic element are disposed on the fixed portion.

5. The optical element driving mechanism as claimed in claim 1, further comprising two position sensors, wherein one of the position sensors is at least partially disposed on the first movable portion and the fixed portion, and another position sensor is at least partially disposed on the second movable portion and the fixed portion.

6. The optical element driving mechanism as claimed in claim 1, further comprising two position sensors at least partially disposed on the first movable portion.

7. The optical element driving mechanism as claimed in claim 1, further comprising a position adjusting element disposed between the first connecting portion and the fixed portion.

8. The optical element driving mechanism as claimed in claim 1, wherein the height of the first movable portion is greater than the height of the second movable portion along the main axis.

9. The optical element driving mechanism as claimed in claim 1, wherein the fixed portion has a recess, and one of the second connecting portions is disposed in the recess.

10. The optical element driving mechanism as claimed in claim 9, wherein the recess has an arc shape, and the second connecting portion has a column shape, and the radius of curvature of the recess is greater than the radius of curvature of the second connecting portion.

11. The optical element driving mechanism as claimed in claim 9, wherein the fixed portion comprises a case disposed on the recess, a bottom surface of the case faces the recess, and the second connecting portion has a distance that is greater than zero to the bottom surface.

12. The optical element driving mechanism as claimed in claim 9, wherein the shape of the recess comprises a V shape, a rectangle, a trapezoid, an oval, or an arc shape.

13. The optical element driving mechanism as claimed in claim 1, further comprising a resilient element disposed on the movable portion.

14. The optical element driving mechanism as claimed in claim 1, wherein a center of the optical element driving mechanism has a distance that is greater than zero to the main axis when viewed along the main axis.

15. The optical element driving mechanism as claimed in claim 1, wherein the material of the first connecting portion comprises metal.

16. The optical element driving mechanism as claimed in claim 1, wherein the optical element driving mechanism is connected to the optical element through an optical module, and the optical module is in direct contact with the movable portion.

17. The optical element driving mechanism as claimed in claim 16, wherein the optical module is connected to the movable portion at corners of the optical module, and the optical module is affixed to the movable portion.

* * * * *